(No Model.)
J. F. WILLIAMS.
HARROW ATTACHMENT FOR PLOWS.
No. 404,142. Patented May 28, 1889.
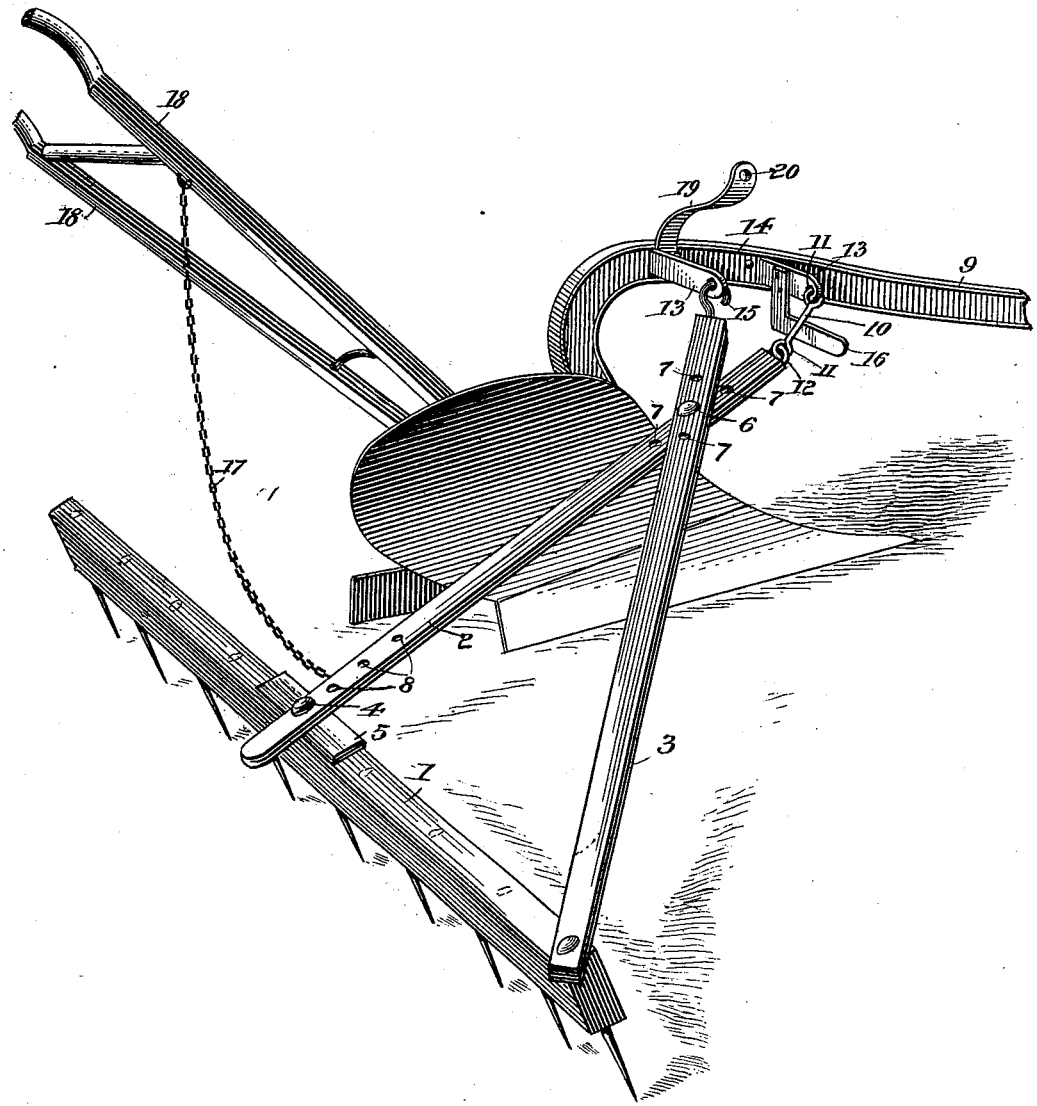
WITNESSES:
INVENTOR:
ATTORNEYS.

UNITED STATES PATENT OFFICE.

JOHN F. WILLIAMS, OF GRAND FORKS, DAKOTA TERRITORY.

HARROW ATTACHMENT FOR PLOWS.

SPECIFICATION forming part of Letters Patent No. 404,142, dated May 28, 1889.

Application filed August 17, 1888. Serial No. 282,978. (No model.)

*To all whom it may concern:*

Be it known that I, JOHN F. WILLIAMS, of Grand Forks, in the county of Grand Forks and Territory of Dakota, have invented a new and Improved Harrow Attachment for Plows, of which the following is a full, clear, and exact description.

This invention relates to harrow attachments for plows, and has for its object to provide a harrow attachment of this kind by means of which the harrow may be readily and effectively operated in connection with a plow, and will automatically adjust itself to any irregularity of movement thereof.

The invention consists in a harrow attachment for plows, constructed and arranged as hereinafter described and claimed.

The accompanying drawing illustrates the invention in operative position.

In the construction of this invention a harrow, 1, is provided with a drag-bar, 2, and a brace-bar, 3, the latter being pivoted at its outer end to the outer end of the harrow 1, and the drag-bar 2 being pivoted to the center of the harrow by a pin, 4, passing through a washer, 5, thereon. The drag-bar 2 and brace-bar 3 are pivotally connected together by means of the pin 6, the pivotal connection being adjustable by means of a number of holes, 7, in the bars 2 and 3. The pivotal connection of the outer end of bar 2 may be also adjusted by means of a number of holes, 8, therein. The forward end of bar 2 is flexibly connected to the plow-beam 9 of a plow by means of a rod, 10, having its eye 11 at one end connected to an eyebolt, 12, adjacent to the end of bar 2, and its eye 11 at the other end engaging a perforation in one of the arms 13 of a U-shaped bar, 14, bolted to and projecting laterally from the plow-beam 9. The forward end of the brace-bar 3 is connected to the plow-beam by a hook, 15, on said bar engaging a perforation in the end of the other arm, 13, of the U-shaped bar 14. To the forward arm, 13, is secured an L-shaped arm, 16, on which the rod 10 loosely rests, the arm 16 serving to hold up the forward end of bar 2 when the harrow is raised.

It will thus be seen by means of the foregoing described connections that the harrow 1 will be flexibly connected to the plow-beam and located at one side of and to the rear of the plow, so as to be drawn along with the latter and at the same time automatically adjust itself to any inequalities of the ground or irregular movements of the plow. The harrow will also accommodate itself to any turn of the plow, and does not have to be lifted from the ground.

The angle of the harrow with respect to the line of movement of the plow may be regulated by means of the pins 4 and 6 and the holes 7 and 8 in the bars 2 and 3. The harrow is held from outward movement from the plow by any suitable flexible connection, such as a link-rod, and, as herein shown, preferably by means of the chain 17, secured at one end to the bar 2 and at the other to one of the plow-handles 18. By this flexible connection the harrow can be raised up to shake off any rubbish thereon.

Bolted to back end of U-shaped bar 14 is a vertical bar, 19, preferably curved inward and upward, with an eye, 20, in its end located above the rear arm, 13. By means of bar 19 the harrow may be held off of the ground by securing bar 3 to bar 19.

By means of this invention the harrow may be effectively operated in connection with a plow over any kind of ground and in any direction of movement of the plow.

Having thus described my invention, what I claim as new, and desire to secure by Letters Patent, is—

1. A harrow attachment for plows, consisting of a toothed bar, a drag-bar pivoted at about the middle of its length, a brace-bar pivoted to one end of the toothed bar and to the drag-bar, and a U-shaped bar adapted to be secured to the plow-beam, and to the arms of which the drag-bar and brace-bar are flexibly connected, substantially as described.

2. A harrow attachment for plows, consisting of the toothed bar 1, the drag-bar 2, pivoted to the middle of the toothed bar, the brace-bar 3, pivoted to the outer end of the toothed bar and to the forward end of the drag-bar, and the U-shaped bar 14, provided with the arms 13, one of which is provided with L-shaped arm 16, and the upwardly-projecting bar 19, the drag-bar and brace-bar being pivotally connected to the said arms 13, substantially as herein shown and described.

3. The combination, with plow-beam 9, of U-shaped bar 14, having perforated arms 13, and vertical arm 19, with hole 20, and L-shaped arm 16, secured to forward arm, 13, harrow 1, drag-bar 2, having one of its ends provided with perforations 8 and connected by pin 4 with harrow 1 and its other end resting on arm 16 and flexibly connected to forward arm, 13, by rod 10, having eyes 11 engaging said arm 13 and ring 12 in bar 2, brace-bar 3, pivoted at one end to the outer end of harrow 1, at its other end being connected by hook 15 to the rear arm, 13, and adjustably pivoted between its ends to drag-bar 2 by pin 6, by a series of adjacent holes, 7, in bars 2 3, and the chain 17, connected at one end to the outer end of rod 2 and at the other to one of the plow-handles 18, substantially as shown and described.

JOHN F. WILLIAMS.

Witnesses:
H. C. RICHARDS,
R. JARVIS.